W. SCOTT.
CHANGEABLE SPEED GEARING.
APPLICATION FILED DEC. 10, 1908.
928,705.
Patented July 20, 1909.
2 SHEETS—SHEET 1.
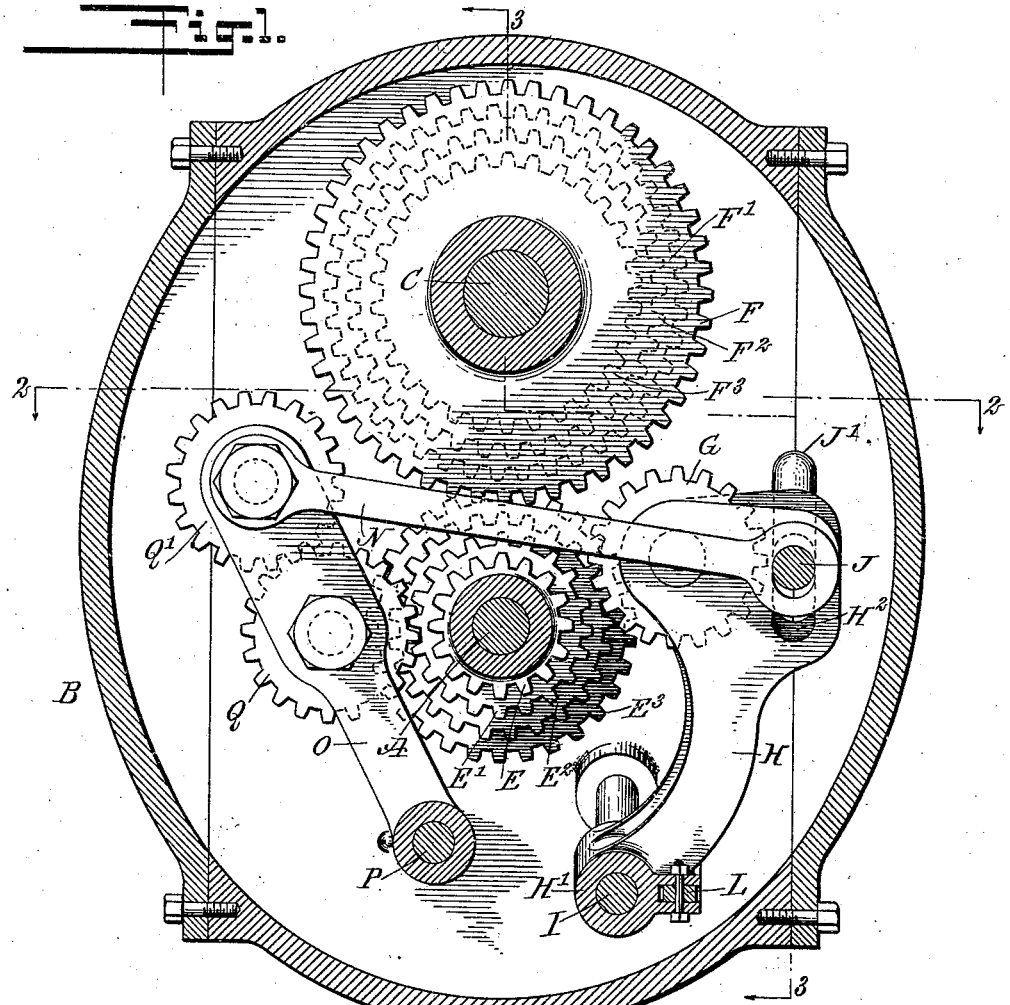
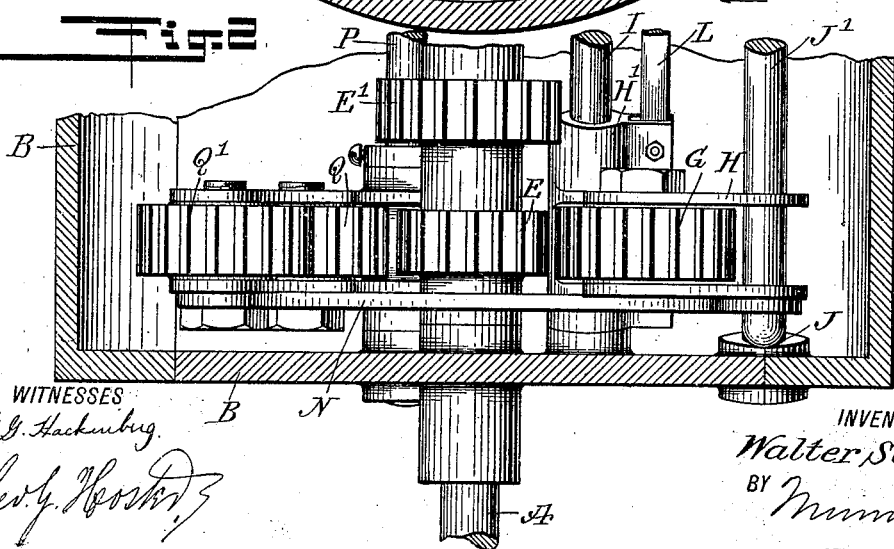
WITNESSES
INVENTOR
Walter Scott
BY
ATTORNEYS W. SCOTT.
CHANGEABLE SPEED GEARING.
APPLICATION FILED DEC. 10, 1908.
928,705.
Patented July 20, 1909.
2 SHEETS—SHEET 2.
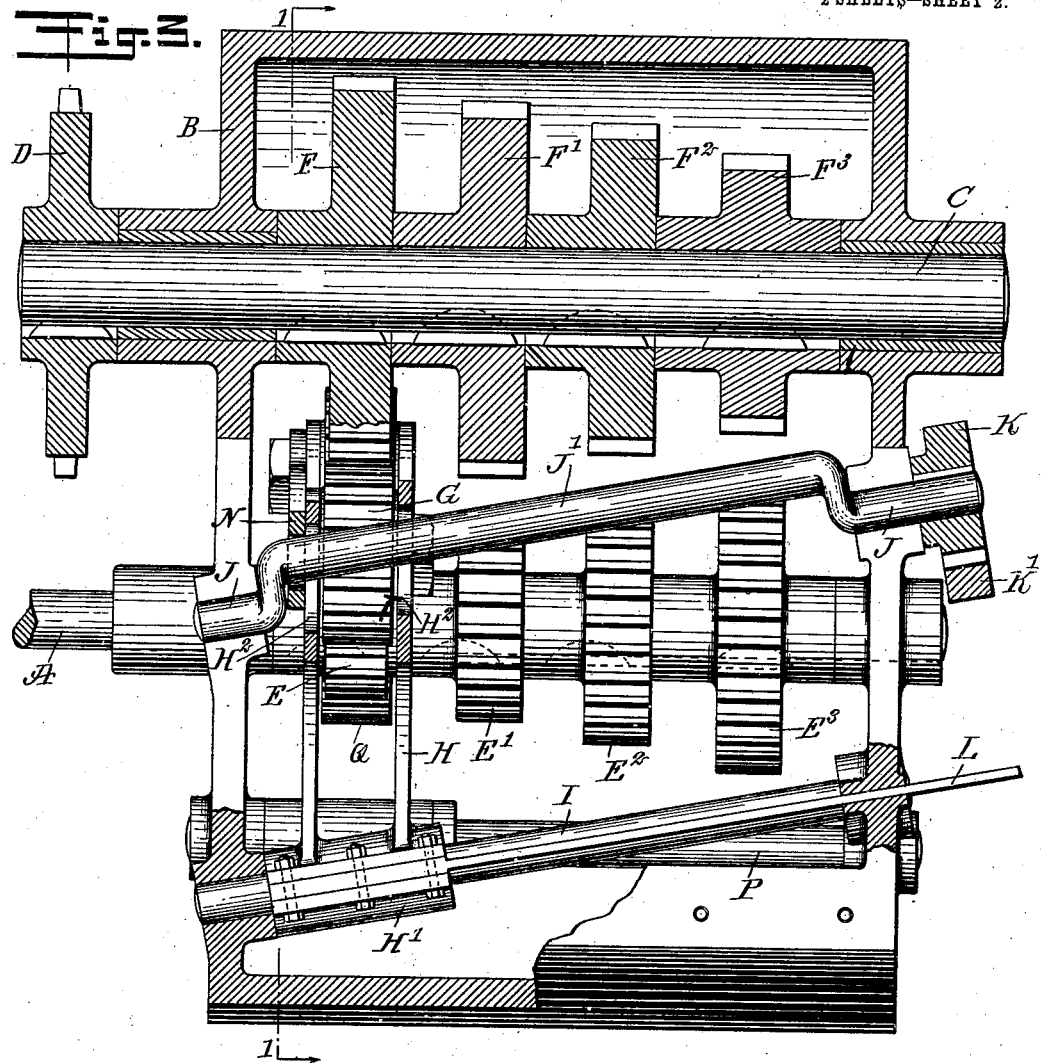
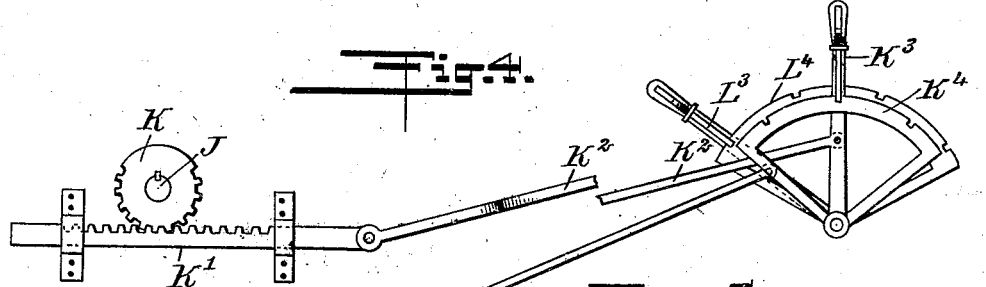
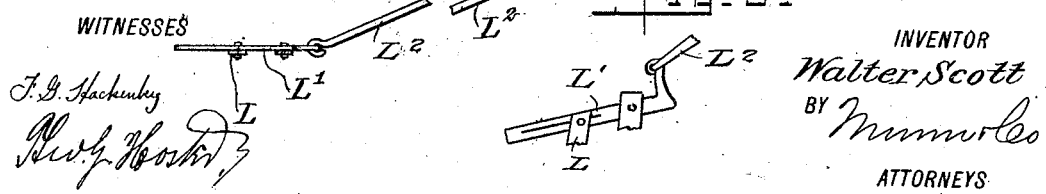
WITNESSES
INVENTOR
Walter Scott
BY
ATTORNEYS

UNITED STATES PATENT OFFICE.

WALTER SCOTT, OF SHERIDAN, WYOMING.

CHANGEABLE-SPEED GEARING.

No. 928,705.　　　Specification of Letters Patent.　　　Patented July 20, 1909.

Application filed December 10, 1908. Serial No. 466,786.

*To all whom it may concern:*

Be it known that I, WALTER SCOTT, a citizen of the United States, and a resident of Sheridan, in the county of Sheridan and State of Wyoming, have invented a new and Improved Changeable-Speed Gearing, of which the following is a full, clear, and exact description.

The object of the invention is to provide a new and improved speed gearing, more especially designed for use in the driving mechanism of automobiles and other machines, and arranged to enable the operator to use any one of four different speeds for driving ahead and a single speed for driving backward.

The invention consists of novel features and parts and combinations of the same, which will be more fully described hereinafter and then pointed out in the claims.

A practical embodiment of the invention is represented in the accompanying drawings forming a part of this specification in which similar characters of reference indicate corresponding parts in all the views.

Figure 1 is a sectional side elevation of the improvement on the line 1—1 of Fig. 3; Fig. 2 is a sectional plan view of the same on the line 2—2 of Fig. 1; Fig. 3 is a transverse section of the same on the line 3—3 of Fig. 1; Fig. 4 is a side view of the shifting mechanism, and Fig. 5 is a detail view of the same.

The driving shaft A is connected with an engine or other motor and extends into and is journaled in a casing B, in which is also journaled a driven shaft C provided at one end with a sprocket wheel D, connected in the usual manner with the object to be driven. The shaft C may also represent the axle of the vehicle in case a direct drive is desired.

On the driving shaft A are secured a number of spur wheels E, E′, E², E³ of different diameters and ranging opposite spur wheels F, F′, F², F³ of different diameters and secured to the driven shaft C, so that the spur wheels E, F, E′, F′, E², F², and E³, F³ form pairs of spur wheels adapted to be geared together by the use of an intermediate gear wheel G journaled in a lever H having its hub H′ mounted to turn and to slide on a shaft I held on the casing B. The lever H is provided with elongated apertures H² through which extends loosely the crank J′ of a crank shaft J, journaled in suitable bearings arranged on the casing B, and on one outer end of the crank shaft J is secured a gear wheel K in mesh with a rack K′ mounted to slide and connected by a link K² with a hand lever K³ under the control of the operator and adapted to be locked to a notched quadrant K⁴. Now when the hand lever K³ is in a vertical position, as shown in Fig. 4, then the gear wheel G is out of mesh with the pairs of spur wheels secured on the driving shaft A and the driven shaft C, but when the operator swings the hand lever to the right, then the rack K′ turns the gear wheel K and consequently the crank shaft J, so that the crank J′ thereof swings the lever H inward to move the gear wheel G in mesh with the corresponding gear wheels E, F, E′, F′ E², F² or E³, F³. Now in order to bring the gear wheel G opposite a corresponding pair of gear wheels on the shafts A and C, the lever H is bodily moved on the shaft I, and for this purpose the hub H′ of the lever H is provided with a rod L connected by a bell crank lever L′ with a link L² pivotally connected with a hand lever L³ adapted to be locked on a notched quadrant L⁴, as indicated in Fig. 4. Now when the several parts are in the position as shown in Figs. 3 and 4, and the operator imparts a swinging motion to the hand lever L³ from the left to the right, then the lever H is shifted in a like direction, thus moving the gear wheel G opposite any one of the pairs of gear wheels on the shafts A and C. When the desired position has been reached the operator imparts a swinging motion to the lever K³, as previously explained, so as to swing the lever H inward to move the gear wheel G in mesh with the corresponding pair of gear wheels E, F, E′, F′, E², F² and E³, F³.

By reference to Fig. 3 it will be seen that the crank shaft J and the shaft I are arranged parallel one to the other and at an angle to the parallel shafts A and C, the angle corresponding to the increase in the sizes of the gear wheels on the shafts A and C, as will be readily understood by reference to Fig. 3. By the arrangement described the operator can move the gear wheel G into mesh with any one of the pairs of gear wheels E, F, E′, F′, E², F², so as to drive the shaft C at different speeds from the shaft A, or at the same speed whenever the gear wheel G is in mesh with the gear wheels E³, F³ alike in size.

In order to rotate the driven shaft C in a reverse direction the following arrangement is made: A link N pivotally connects the crank J′ of the crank shaft J with a lever O attached to a shaft P journaled in the casing B, and on the said lever O are mounted the intermediate reversing gear wheels Q and Q' in mesh with each other and adapted to mesh with the gear wheels E and F secured on the shafts A and C, respectively. Now when the operator swings the hand lever K³ from the normal vertical position to the left, then the shaft J is turned so as to swing the lever H outward and by the link N to swing the lever O inward, thus moving the gear wheels Q and Q' in mesh with the gear wheels E and F. As the gear wheels Q and Q' are in mesh with each other, it is evident that the shaft C is turned in a reverse direction from that of the shaft A whenever it is desired to back up the automobile.

It is understood that when the crank J' of the crank shaft J stands in a vertical position as shown in the drawings, neither of the gear wheels G, Q or Q' is in mesh with any one of the gear wheels on the shafts A and C, that is, the shafts A and C are disconnected.

Although I have shown four pairs of gear wheels on the shafts A and C, it is evident that more or less such pairs of gear wheels may be employed if desired.

Having thus described my invention, I claim as new and desire to secure by Letters Patent:

1. A changeable speed gearing, comprising a driven shaft, a driving shaft, pairs of gear wheels secured to the said shafts, an intermediate gear wheel adapted to mesh with each pair of gear wheels, a lever on which the said intermediate gear wheel is journaled, manually-controlled means for rocking the said lever, and manually-controlled means for imparting a bodily sliding movement to the said lever to move the intermediate gear wheels in position for engagement with either one of the said pairs of gear wheels.

2. A changeable speed gearing comprising a driven shaft, a plurality of spur wheels secured to the said driven shaft, a driving shaft parallel to the said driven shaft, a plurality of spur wheels secured to the said driving shaft and ranging opposite the said spur wheels on the driven shaft, a lever mounted to slide bodily in front of the said gear wheels and to swing toward and from the same, an intermediate gear wheel journaled on the said lever, for connecting corresponding pairs of spur wheels on the said driven and the said driving shafts with each other, a manually-controlled crank shaft engaging the said lever for imparting a swinging motion to the same, and manually-controlled means connected with the said lever for imparting a sliding motion to the same.

3. A changeable speed gearing comprising a driven shaft, a plurality of spur wheels secured to the said driven shaft, a driving shaft parallel to the said driven shaft, a plurality of spur wheels secured to the said driving shaft and ranging opposite the said spur wheels on the driven shaft, a lever mounted to slide bodily in front of the said gear wheels and to swing toward and from the same, an intermediate gear wheel journaled on the said lever, for connecting corresponding pairs of spur wheels on the said driven and the said driving shafts with each other, a manually-controlled crank shaft engaging the said lever for imparting a swinging motion to the same, the said crank shaft having its axis at an angle to the axes of the said parallel driving and driven shafts, and manually-controlled means connected with the said lever for imparting a sliding motion to the same.

4. A changeable speed gearing comprising a driven shaft, a plurality of spur wheels secured to the said driven shaft, a driving shaft parallel to the said driven shaft, a plurality of spur wheels secured to the said driving shaft and ranging opposite the said spur wheels on the driven shaft, a lever mounted to slide bodily in front of the said gear wheels and to swing toward and from the same, an intermediate gear wheel journaled on the said lever, for connecting corresponding pairs of spur wheels on the said driven and the said driving shafts with each other, a manually-controlled crank shaft engaging the said lever for imparting a swinging motion to the same, the said crank shaft having its axis at an angle to the axes of the said driving and driven shafts, a guideway for the said lever to slide on and arranged parallel to the said crank shaft, and manually-controlled means for imparting a sliding motion to the said lever.

5. A changeable speed gearing comprising a driven shaft, a driving shaft, pairs of gear wheels secured to the said shafts, an intermediate gear wheel adapted to mesh with each pair of gear wheels, a lever on which the said intermediate gear wheel is journaled, manually-controlled means for rocking the said lever, manually-controlled means for imparting a bodily sliding movement to the said lever to move the intermediate gear wheels in position for engagement with either one of the said pairs of gear wheels, a second lever, a link connecting the said second lever with the said crank shaft, and a set of intermediate reversing gear wheels journaled on the said second lever and in mesh with each other, the said set of intermediate reversing gear wheels being adapted to mesh with a pair of the said gear wheels on the said driving and driven shafts.

6. A changeable speed gearing comprising a driven shaft, a plurality of spur wheels secured to the said driven shaft, a driving shaft parallel to the said driven shaft, a plurality of spur wheels secured to the said driving shaft and ranging opposite the said spur wheels on the driven shaft, a lever mounted to slide bodily in front of the said gear wheels and to swing toward and from the same, an intermediate gear wheel journaled on the said lever, for connecting corresponding pairs of spur wheels on the said driven and the said driving shafts with each other, a manually-controlled crank shaft engaging the said lever for imparting a swinging motion to the same, the said crank shaft having its axis at an angle to the axes of the said driving and driven shafts, a guideway for the said lever to slide on and arranged parallel to the said crank shaft, manually-controlled means for imparting a sliding motion to the said lever, a second lever, a link connecting the said second lever with the said crank shaft, and a set of intermediate reversing gear wheels journaled on the said second lever and in mesh with each other, the said set of intermediate reversing gear wheels being adapted to mesh with a pair of the said gear wheels on the said driving and driven shafts.

In testimony whereof I have signed my name to this specification in the presence of two subscribing witnesses.

WALTER SCOTT.

Witnesses:
HARRY M. HUNTINGTON,
SAMUEL P. CADLE.